Oct. 27, 1964    K. B. BREDTSCHNEIDER ETAL    3,154,094
BALL VALVE
Filed Oct. 25, 1961          6 Sheets-Sheet 3
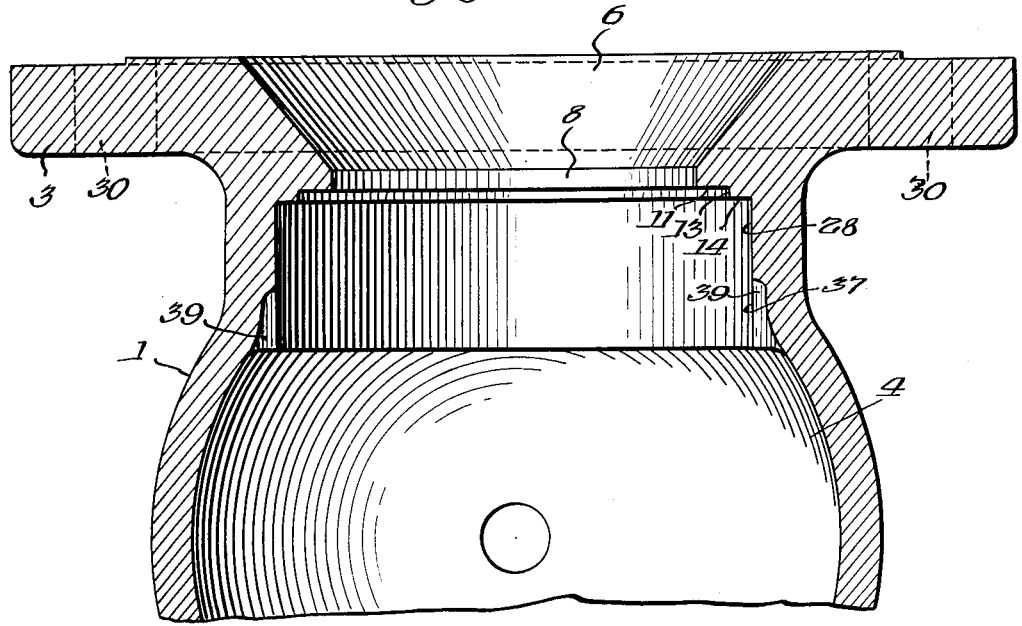
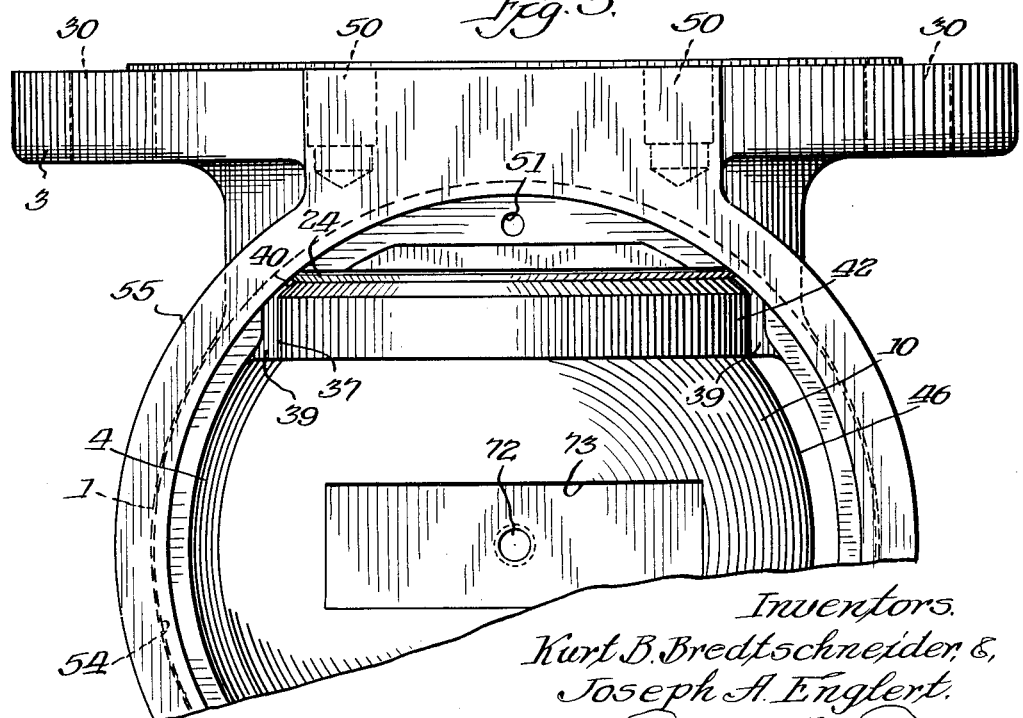
Inventors.
Kurt B. Bredtschneider, &
Joseph A. Englert.

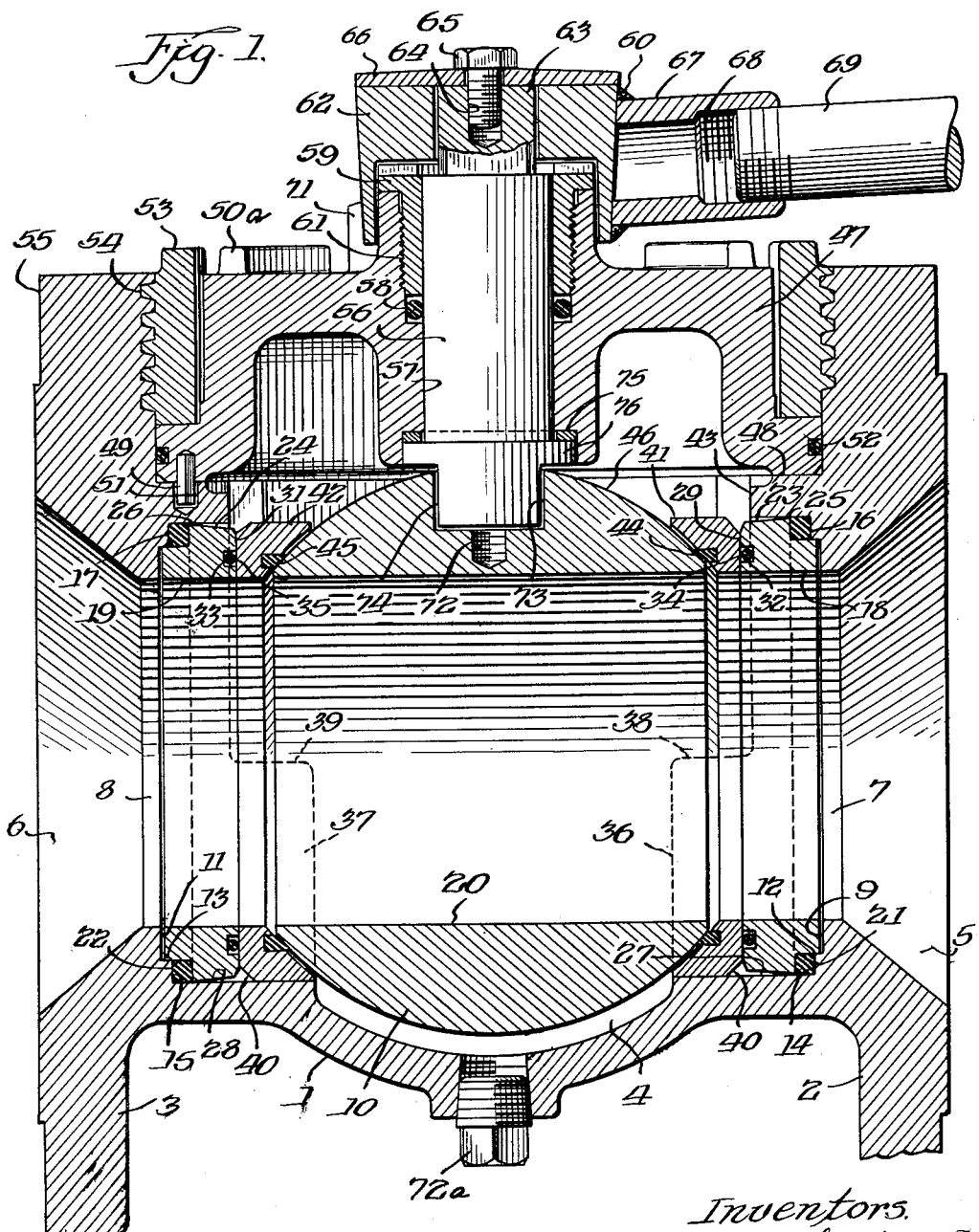

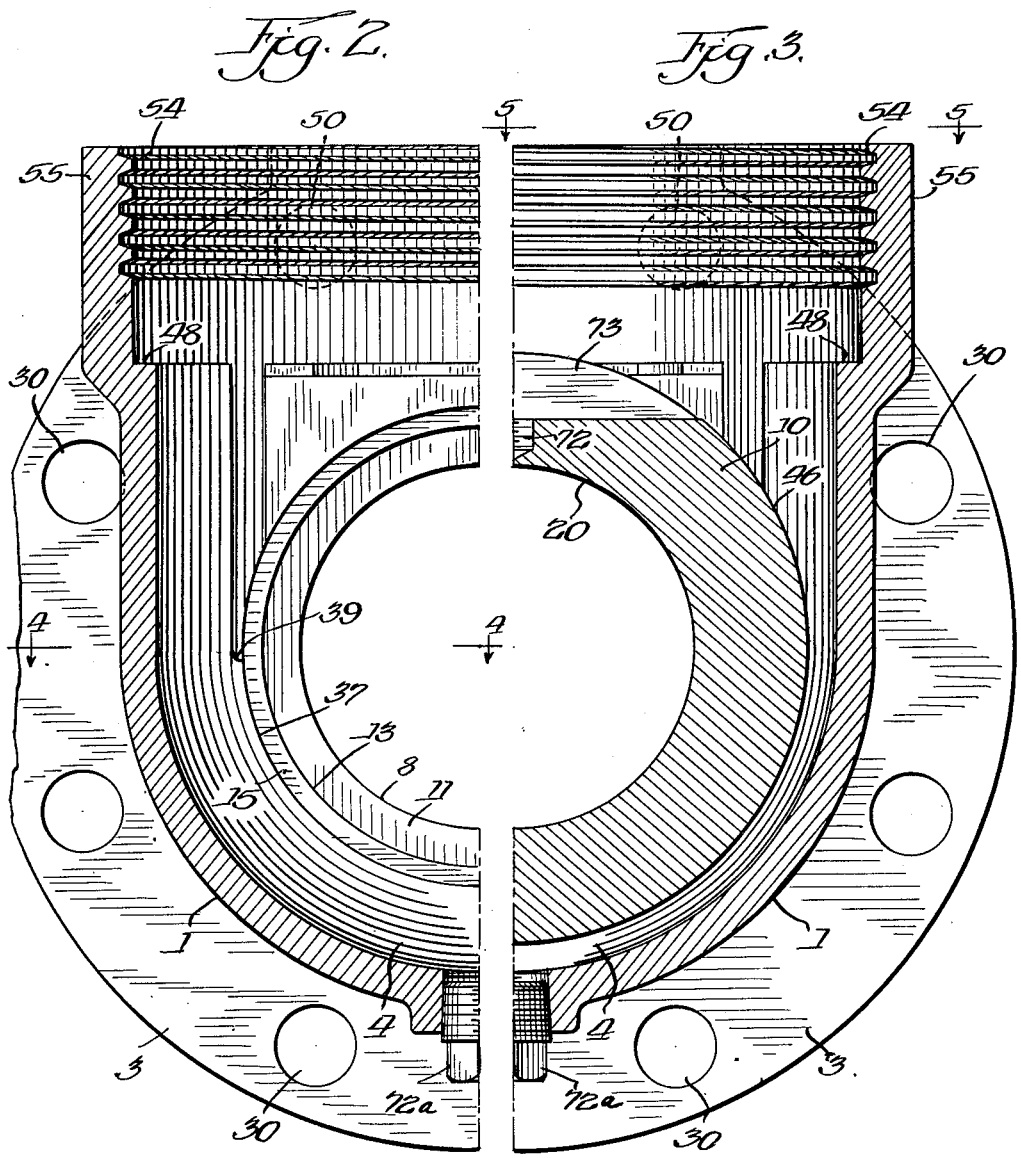

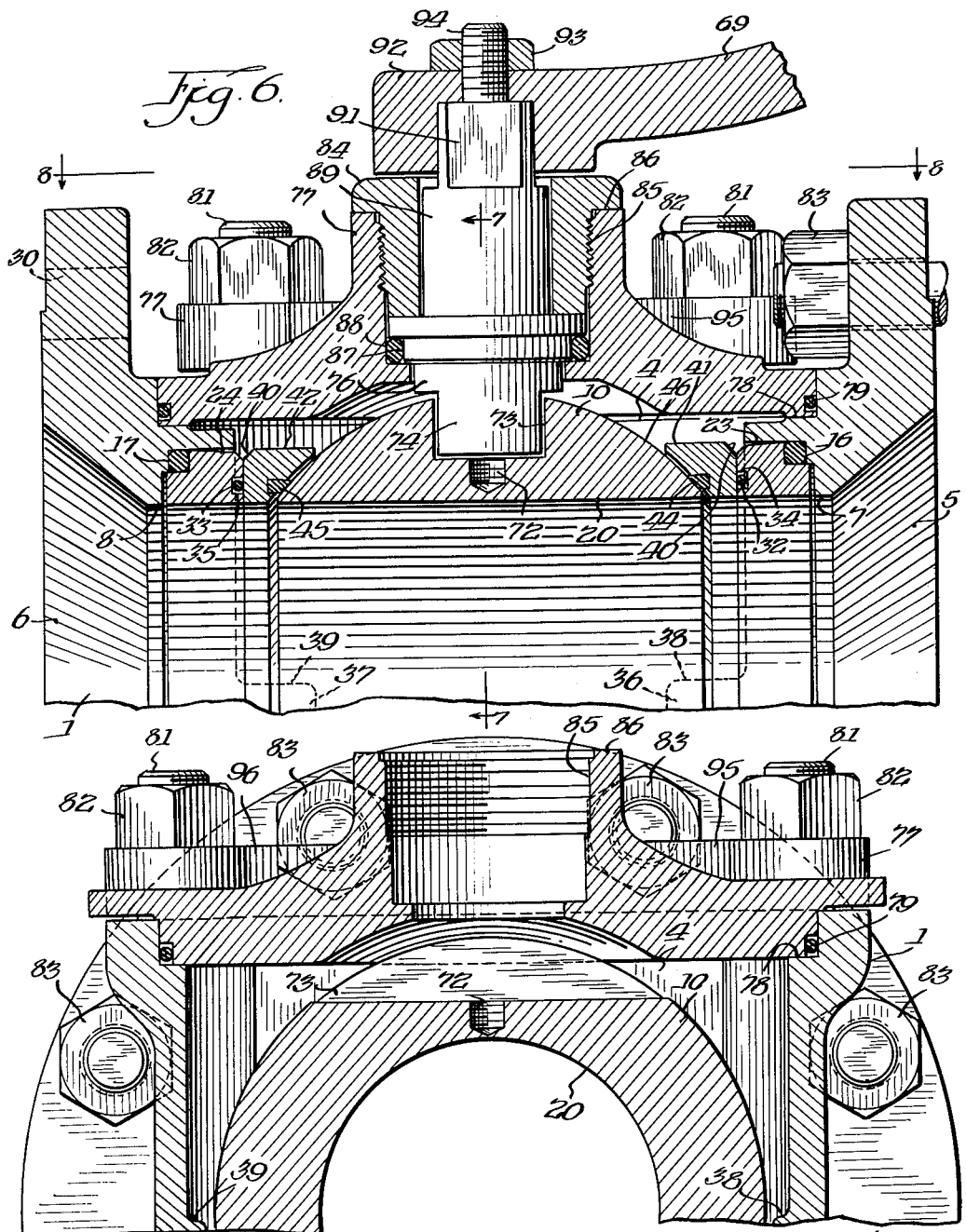

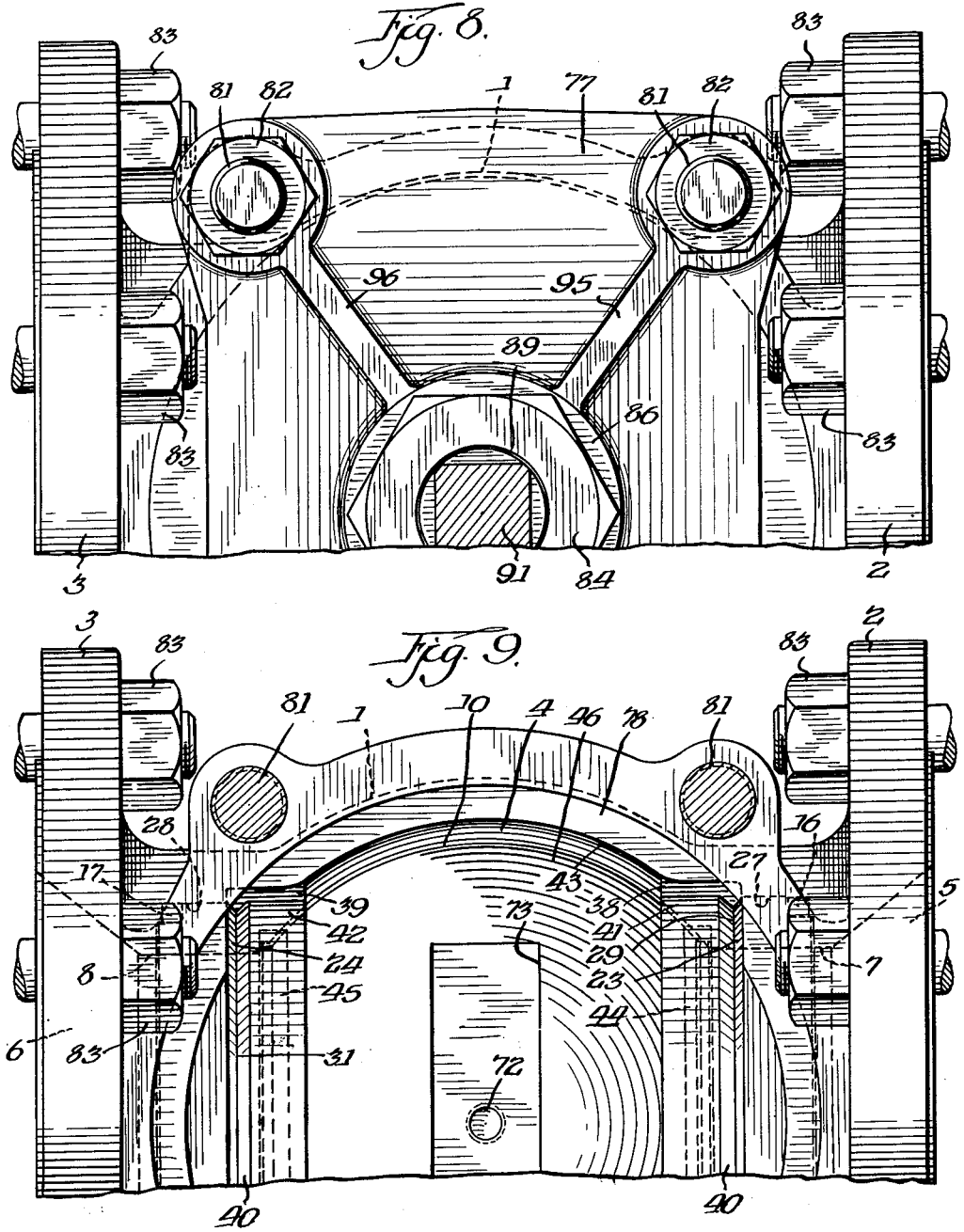

Oct. 27, 1964 K. B. BREDTSCHNEIDER ETAL 3,154,094
BALL VALVE

Filed Oct. 25, 1961 6 Sheets—Sheet 6

Inventors.
Kurt B. Bredtschneider, &
Joseph A. Englert.
By Joseph O. Lange
Atty.

United States Patent Office 3,154,094
Patented Oct. 27, 1964

3,154,094
BALL VALVE
Kurt B. Bredtschneider and Joseph A. Englert, Chicago, Ill., assignors to Crane Co., Chicago, Ill., a corporation of Illinois
Filed Oct. 25, 1961, Ser. No. 147,521
7 Claims. (Cl. 137—315)

This invention relates generally to the type of valve referred to by those skilled in the art as a ball valve. More particularly, it is concerned with the type of ball valve construction, in which ease of inspection, replacement, or repair of the ball valve closure member and its complementary seats are featured, and this is particularly true in those cases in which such valves are of relatively large size. In order to obtain a better appreciation of the background of this invention, it should be further understood that in most valves of this general character, the removability of seats and the closure members has been provided heretofore through valve casing end openings. Obviously, this structural provision is objectionable in that it makes it necessary to dismantle the valve assembly to the extent of actually disconnecting and removing the valve casing from the pipe line upon which it is installed. This valve dismantling operation is necessarily costly, wasteful in time and labor and entails relatively extended shutdowns of the line, and often requires re-working or remaking the pipe joints.

Therefore, it is one of the more important objects of this invention to provide for a ball valve construction in which not only is the closure member and the actuating mechanism therefor conveniently removable from the bonnet opening in the top of the casing, but further, such advantage in removability applies to the body seat rings therefor, even if the latter assembly consists of back-up rings as well as the seat rings carrying the seat contacts for the closure member.

A further important object is to provide for a back-up ring and seat ring combination in which the accurate positioning of the valve seating is readily accomplished. Also, the inspection and replacement of such rings is conveniently accomplished upon relatively simple removal of the ball closure member together with its seats attached. This is usually effected after actuating mechanism with its journalling means has been removed.

A still further important object of this invention is to provide for a ball valve construction in which the easily removable back-up rings and seats are resiliently mounted in pressure sealing relation to the valve casing, whereby to effect the desired uniform seat compression load or end thrust of the seats against the valve closure member at substantially all times.

Other important objects and advantages will become more readily apparent upon proceeding with the following description read in light of the accompanying drawings, in which:

FIG. 1 is a sectional assembly view of a preferred embodiment of our invention;

FIG. 2 is a quarter sectional view on a substantially vertical sectional plane with the ball closure member and the seat rings removed, together with the valve actuating mechanism;

FIG. 3 is a sectional view similar to that described in connection with FIG. 2, except that the ball closure member is shown in the open position, but with the valve actuating mechanism and journalling means therefor removed from the casing;

FIG. 4 is a fragmentary sectional view taken on the line 4—4 of FIG. 2;

FIG. 5 is a fragmentary sectional view taken on the line 5—5 of FIG. 3;

FIG. 6 is a fragmentary sectional assembly view of a modified form;

FIG. 7 is a fragmentary view taken on the line 7—7 of FIG. 6;

FIG. 8 is a fragmentary exterior plan view taken on the line 8—8 of FIG. 6;

FIG. 9 is a plan view of the construction shown in FIGS. 6 to 8 inclusive, with the bonnet and valve actuating mechanism removed.

Similar reference numerals refer to similar parts throughout the several views.

Figure 10:
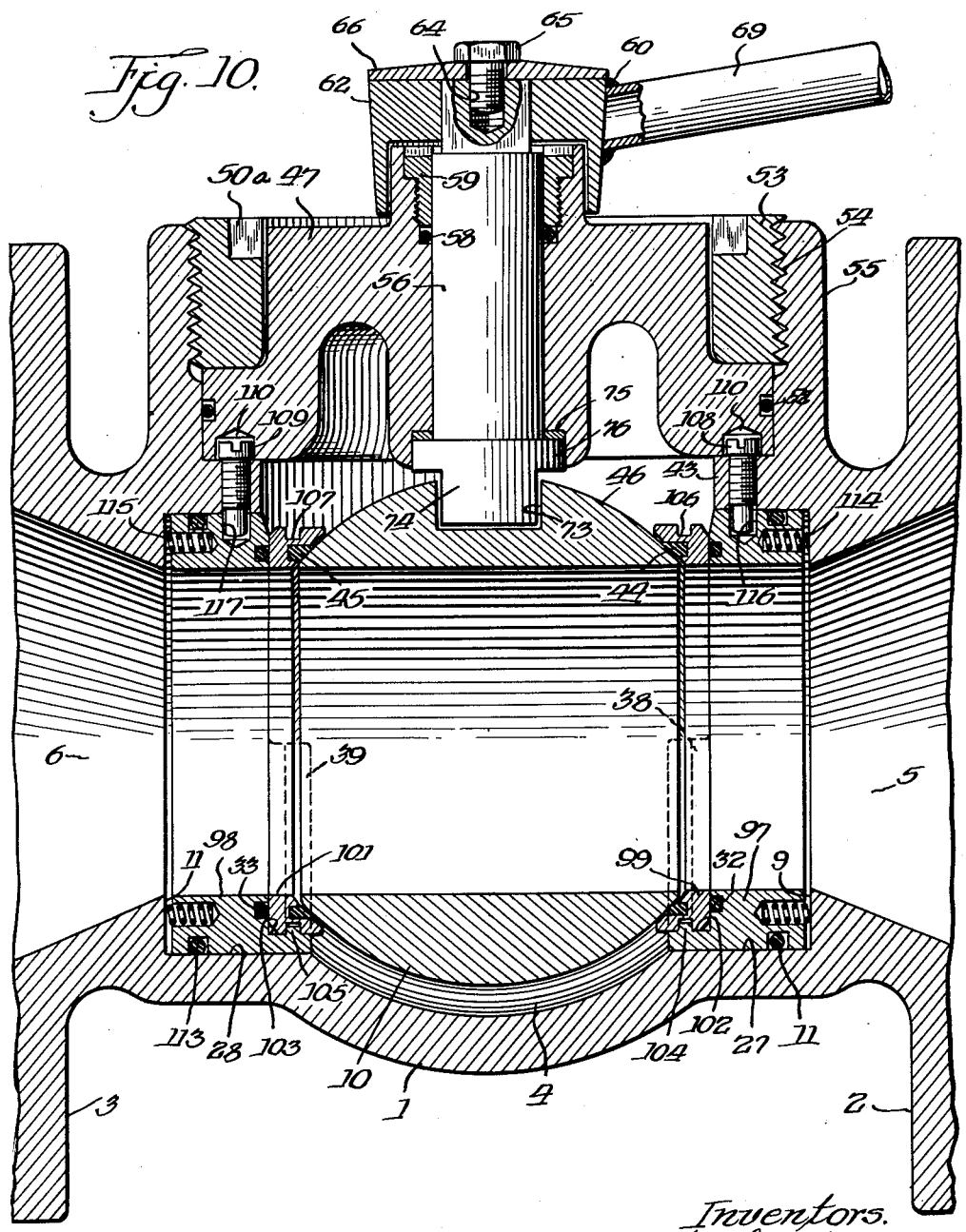
FIG. 10 is a sectional assembly view of a further modified form of the invention.

Referring now to FIG. 1, a valve body or casing 1 is shown having the usual end flange connections 2 and 3 for effecting attachment to a pipe line (not shown), such attachment usually being accomplished by means of holes 30 or tappings 50 (FIGS. 2, 3, and 5) for bolts (not shown) or the casing may be either welded, soldered, brazed, threaded, or otherwise designed to effect said attachment to a line. At a central inner portion thereof, the valve casing 1 is provided with a valve chamber 4, the latter being located intermediate of the casing passages 5 and 6. Within the said valve chamber the spheroidal closure member 10 is received as shown, the said closure member being through-ported at 20. The valve chamber 4 at each of its outer end portions connecting with the respective passages 5 and 6 is provided with the reduced port openings 7 and 8. Located still further inwardly of the openings 7 and 8, the transversely extending annular port surfaces 9 and 11 are provided, their inner edge limits being defined by the respective annular shoulders 12 and 13. The said annular shoulders are provided with further complementary surfaces extending peripherally outwardly as indicated at 14 and 15 respectively for receiving snugly and preferably under relative compression the O-rings 16 and 17. These rings therefore substantially fill the annular receiving chamber, as illustrated, when the back-up rings 18 and 19 are assembled in the casing as later described. The said back-up rings are made with the annularly relieved outer portions 21 and 22 snugly received within the shouldering surfaces 12 and 13 to form said O-ring receiving chamber. On the outer periphery of the fluid-sealing back-up rings 18 and 19, the tapered annular surfaces 23 and 24 are provided, which at the outer diameters 25 and 26 thereof are relatively snugly received within the body bore defined by surfaces 27 and 28, as shown. This arrangement allows for desirable rockability of the back-up rings as hereinafter referred to in greater detail. The tight annular fits thus effected at annular surfaces 25 and 26 assure the retention of the O-rings 16 and 17 while minimizing the opportunity for loss or escape of the ring material therepast under the high compression loads to which the rings 18 and 19 may be exposed during service.

On the respective innermost transverse annular surfaces 29 and 31 of the back-up rings 18 and 19, annular grooves 32 and 33 are provided to receive the respective O-rings 34 and 35.

An important element of this invention lies in the novel structural provision in the valve casing immediately hereinafter described. It will be noted that as the casing bored portions 27 and 28 continue inwardly, the valve casing is specially formed to provide the oppositely disposed extension portions 36 and 37 in the casing which at their side limits terminate at 38 and 39 and are open thereby to form cradle portions or arcuate surfaces for carrying the respective seat rings 41 and 42. In assembling the latter within the casing, they are placed in position through the body opening 43 after the respective back-up rings 18 and 19 have been removed axially outwardly along their respective annular surfaces 27 and 28 to the normal position illustrated. In this connection, it should be understood that in assembling the insertion of the valve shut-off members (the ball closure member and the accompanying seat rings) is done by pressing the seat ring under a slight deviation from the valve vertical axis against said ball closure member so that by lowering the said ball closure member and its seat rings 41 and 42 into the valve body or casing 1 the back-up rings 18 and 19 are moved axially outwardly. This is due to the wedging action thus provided. Under such condition, the resilient sealing members 17 (or as later referred to, the springs 115 of FIG. 10) are predeterminately compressed whereby to obtain the desired initial end pressure or seating load between the ball closure member and the seat rings. Thus, the seat rings are slightly inclined relative to the ball closure as the lower portions of said seat rings during such assembly make their initial contact with the surfaces 29 and 31 of their respective back-up rings.

As previously indicated, the back-up rings bear against the O-rings 16 and 17 to provide compression thereagainst sufficient to permit the fluid sealing by the said back-up rings with said casing shoulder surfaces 9 and 11. It should be understood as previously indicated that before the seat rings 41 and 42 are placed in position in the casing, the ball closure member 10 will previously have already received thereon the seat rings in the partially telescoped relation shown in the drawing. The seat rings 41 and 42 are preferably chamfered annularly at 40 to facilitate their positioning transversely across the faces 34 and 35 of the respective back-up rings. The annular seats at 44 and 45 slightly projecting beyond their retaining seat rings make the fluid sealing contact with the ball closure member spheroidal surface 46 as shown. It will be appreciated that it is a relatively simple matter to then place the bonnet or cover 47 in position supported against the flat annular surface 48 of the casing and preferably held against relative rotation by means of the pin 49 engaging the casing as at 51. Preferably, the bonnet 47 is mounted in fluid sealing relation to the casing by means of the O-ring 52 and is held in firmly against said surface 48 by means of the retainer 53 threadedly engaging as at 54 the upper portion 55 of the casing 1 and gripping means therefor at 50a. The bonnet 47 before being positioned as immediately above described onto the casing is fitted over the actuating stem 56 in journalled relation thereto as at 57. It is preferably sealed by means of the O-ring 58 enclosed by the gland 59 threaded as at the shank portion 61. Superposed over the flanged portion of the gland 59, a shroud type of operating handle hub 62 is applied and held firmly in operating position against the stem 56 by means of the stem polygonal portion 63 threaded as at 64 to receive the cap screw 65, the latter bearing against the retaining washer 66. On a side portion thereof, the operating lever hub 62 may be fitted with the protruding tapped member 67 threaded as at 68 to receive the gripping lever 69, a portion of which is shown. The stop 71 for the handle is of the usual lug type to serve as the means for limiting the arcuate movement of the lever 69 to substantially 90 degrees of such movement. A clean-out plug 72a of the casing is used to drain such accumulations as line sediment or condensate as may occur in service below the ball closure member 10.

The transverse sectional view of FIG. 4 shows the structural details of the valve casing by which the surfaces 28 and 37 cooperate to provide the receiving and ultimately the supporting means for the respective back-up rings 18 and 19 and seat rings 41 and 42.

For the purpose of lifting out and removing the ball closure member 10, the tapped portion 72 is used for conventional engagement by a threaded rod (not shown). The said tap is applied immediately below the recess or groove 73 engaging the stem 56 at the flattened portion 74. A conventional thrust washer 75 absorbs such outward force as may be exerted by the shoulder 76 of the stem during the course of service by line fluid pressure.

The detailed construction in which the body chamber 4 may be plugged or covered may obviously vary substantially from that shown and described in connection with FIGS. 1 to 5 inclusive, and in this connection, attention is now directed to the construction of the fragmentary assembly shown in FIG. 6 in which the bonnet 77 is received in a recess defined by the annular flat surface 78 and maintained in fluid sealing relation thereto by the O-ring 79. The bonnet is held in place by means of the studs 81 and nuts 82, the latter assembly being effected as shown more clearly in FIG. 8 at the end portions of the bonnet cover 77. The provision of such flange arrangement enables the end flange bolting 83 to be positioned between the studs 81 as shown more clearly in the sectional end view of FIG. 7. The arrangement by which the spheroidal closure member 10 is held in place is similar to that described in connection with FIG. 1, except that the threaded gland 84 is threaded as at 85 to shoulder as at 86 and provide an annular chamber at 87 to receive the sealing ring or packing 88 under the desired compression to effect a seal. The valve actuating stem 89 at its upper or outer end portion is flatted polygonally formed at 91 to receive the recessed portion of the handle 92. The latter member is attached by means of a nut 93 to the stem threaded shank 94 to complete the valve stem lever operating assembly.

As shown more clearly in FIG. 8, in order to impart the necessary strength and stiffness to the bonnet flange 77, suitable integral struts are provided diagonally extending at 95 and 96 to impart the function stated. In other respects, the construction described in FIGS. 6 to 9 inclusive follows the seat and spheroidal closure arrangement described in connection with the previous figures and therefore it is deemed unnecessary to repeat the description thereof.

In some cases, it may be advantageous to provide a structure in which the casing retaining means for the back-up rings provide an additional retaining means as distinguished from FIGS. 1 and 6. Yet, the back-up rings permit easy removability of the closure member and seats together with said back-up rings. At the same time, improved supplemental support of the back-up rings is provided, as will hereinafter be more clearly understood. In addition, suitable arcuate ribbing on the back-up rings engage the seat rings to hold the latter members more firmly in position and therefore limiting the axial movement of the seat rings and retained seats.

Referring now to FIG. 10, the general assembly of the valve casing 1 with the ball closure member 10 follows the structural pattern described in connection with the previous figures. The manner of retaining the closure member in assembled position in the casing relative to the back-up rings and seat rings is similar to that shown in FIG. 1, except as to the supplemental retaining means between the back-up rings and the seat rings. In the instant construction, the back-up rings 97 and 98 are placed in position on the circular support surfaces 27 and 28. The inner end cradle portions 38 and 39 shown in dotted lines engage the spheroidal surface 46 of the closure member 10 so that the seat rings 99 and 101 are axially movable only limitedly relative to the respective back-up rings 97 and 98. This significant structural advantage is accomplished by grooving the back-up rings arcuately as at 102 and 103 as determined by the termination locations of the arcuate portions substantially at or below the plane of the valve horizontal axis. The said grooves are engaged by the arcuately extending ribbing at 104 and 105 by their relatively close fit within the grooves 106 and 107 respectively of the seat rings 99 and 101. The latter members as in the previous figures carry the seats 44 and 45 in the usual manner. The O-ring seals at 32 and 33 effect the fluid pressure tightness desired between the back-up rings and the seat rings. It will be appreciated that when the closure member 10 is being assembled with the casing and carries with it at such time the seat rings 99 and 101, the latter will aid in more accurately positioning said closure member when the ribbing 104 and 105 makes its contacts with the back-up ring grooves.

Preferably in order to hold the back-up rings 97 and 98 against rotation, and thus also determine accurately the horizonal planes for the termination of the arcuate portions 38 and 39, cap screws 108 and 109 are employed, the heads of which are received in recesses 110 of the bonnet 47. Further, to provide for fluid sealing at the peripheral portion of the back-up rings, the O-rings 111 and 113 are mounted as shown.

In order to allow for the said back-up rings to be inwardly retained against the seat rings, the said back-up rings are provided with a plurality of annularly spaced apart coiled springs 114 and 115 as shown. Sufficient clearance is preferably made between the ends of the cap screws and the recesses at 116 and 117 to permit slight movement in either direction axially to compensate for wear taking place in reference to the seats 44 received in the seat rings 99 and 101. It will of course be clear that while coiled springs are shown and described for such purpose other forms of resilient means may be used, as, for example, Belleville type of springs, or packing, or even O-rings, such as 16 and 17, of the order described in connection with FIG. 1. The mode of valve operation follows the procedure similar to that described previously in connection with other figures, so that such further description is deemed unnecessary.

It should also be understood that the members 16 and 17 as well as the coiled springs 114 and 115 because of the annular tapered surfaces 23 and 24 on the back-up rings will allow the latter members to be slightly rockable relative to the casing when the ball closure member and its accompanying seats 41 and 42 are being either assembled or removed from the valve casing 1.

In all forms of the invention, the ported ball closure member 10 carrying in telescoped relation thereto the seat rings 41 and 42 upon either assembly with the casing or removal therefrom slide across the inner transverse surfaces of the back-up rings 18 and 19, or 97 and 98, as the case may be. The cradling of the back-up rings as described aids in accurately locating the rings centrally relative to the casing and also retains them in positive fluid-sealing relation.

It will accordingly be appreciated that an invention here has been accomplished resulting in the provision of conveniently removable ball valve closure members, together with easily renewable seating and sealing elements, allowing for ready inspection, replacement or repair whenever necessary without dismantling the pipe line.

It will also be appreciated that while several illustrations of modifications have been shown and described, this is only for purpose of demonstrating the preferred applications of the invention. The scope of this contribution should therefore be measured by the appended claims.

We claim:
1. In a ball valve;
a valve casing therefor with inlet and outlet ports and a valve chamber between the said ports with a wall portion thereof defined by an integral arcuately extenting cradle portion;
a ported ball closure member rotatable within the said chamber;
a cap for closing the said casing, actuating means journalled in the said cap for rotating said closure member;
a plurality of annular seating means for the said closure member substantially defining the outer end limits of said valve chamber;
the said seating means comprising at least a pair of ring-like members mounted in tandem in fluid sealing relation to the said casing;
at least the inner one of said ring-like members being supported within said cradle portion of the valve chamber for permitting the removal thereof simultaneously with said ball closure member through an unsupported outer portion of the cradle portion and subsequently through an opening of the casing extending substantially transversely of the said inlet and outlet ports.

2. In a ball valve;
a valve casing therefor with inlet and outlet ports and a valve chamber with a transverse opening between the said ports and with a wall portion thereof defined by a protruding arcuate cradle portion extending into the chamber;
a ported spheroidal closure member rotatable within the said chamber;
a cap for closing the said casing, actuating means journalled in the said cap for rotating said closure member;
a plurality of seating means for the said closure member defining the outer end limits of said valve chamber;
the said seating means comprising a plurality of ring-like members mounted in end to end fluid sealing relation within the said casing;
at least certain of said ring-like members being supported on an inner arcuate lower surface of said cradle portion for enabling the removal thereof at ends of the arcuate surface and through said transverse opening from the casing between said inlet and outlet ports simultaneously with said spheroidal closure member.

3. In a ball valve;
a valve casing therefor with inlet and outlet ports and a valve chamber between the said ports with a wall portion thereof defined by an integral arcuately extending cradle portion;
a ported ball closure member rotatable within the said chamber;
a cap for closing the said casing, actuating means journalled in the said cap for rotating said closure member;
a plurality of seating means for the said closure member defining the outer end limits of said valve chamber;
the said seating means comprising at least a pair of ring-like members mounted in tandem in fluid sealing relation to the said casing;
at least one of said ring-like members being supported on a substantially semi-circular surface defining said cradle portion of the valve chamber for effecting removal thereof simultaneously with said ball closure member through an opening in the casing extending between and substantially transversely to said inlet and outlet ports;
the other of said ring-like members in tandem relation being outwardly disposed in a substantially circular portion of the casing outwardly beyond said arcuately extending semi-circular surface of said cradle portion.

4. In a rotary ball valve;
a valve body therefor with inlet and outlet ports and a valve chamber between the said ports with a wall portion thereof defined by an arcuately extending relieved portion open at an outer upper portion thereof;
a ported ball closure member rotatable within the said chamber;
a cap for the said body, stem actuating means journalled in the said cap for rotating said closure member;
a plurality of seating means for the said closure member in end to end abutting relation defining the outer end limits of said valve chamber;

the said seating means including a plurality of axially aligned abutting ring-like members in fluid sealing relation to each other and to the said body;

certain of said ring-like members being snugly mounted on said closure member and being received within said open relieved portion of said arcuately extending portion of the valve chamber for also permitting removal thereof simultaneously with said ball closure member through said open relieved wall portion of the chamber extending transversely to the common axis of the said inlet and outlet ports.

5. In a ball valve construction;

a valve body therefor with inlet and outlet ports and a valve chamber between the said ports with a wall portion thereof relieved to form an integral arcuately extending cradle portion therewithin;

a ported spheroidal closure member rotatable within the said chamber;

a bonnet for closing an opening in the said body, actuating means journalled in the said bonnet for rotating said closure member;

a plurality of seating means for the said closure member in the cradle portion to define the outer end portion of said valve chamber;

the said seating means comprising at least a pair of inner and outer ring-like members mounted in a common recess in end-abutting relation in fluid sealed relation to the said body;

at least one of said inner ring-like members having an outer annularly chamfered portion and being carried within said cradle portion of the valve chamber for facilitating assembly and removal thereof through said bonnet opening in the body;

the bonnet opening being substantially transverse to axis of said inlet and outlet ports;

the said inner ring-like members being mounted upon said closure member in the course of assembly with or removal from the said body moving across an inner transverse surface of the outer positioned ring-like members.

6. In a ball valve;

a valve casing therefor with inlet and outlet ports and a valve chamber having an upper opening between the said ports and with side and bottom wall portions thereof being defined by a relieved portion forming an arcuately extending cradle therewithin;

a ported ball closure member rotatable within the said chamber;

a cap for closing said upper opening in the said casing valve chamber, actuating means journalled in the said cap for rotating said closure member;

a plurality of axially aligned seating means for the said closure member defining the outer end limits of said valve chamber;

the said seating means comprising at least a pair of adjoining ring-like members mounted snugly in fluid sealing relation to the said casing;

the said ring-like members being received within said cradle of the valve chamber;

the cradle being open on an upper annular portion thereof for permitting removal through said upper opening in the casing, the latter opening extending substantially transversely to the horizontal axis of said inlet and outlet ports;

the adjoining edges of the said ring-like members being annularly chamfered to facilitate assembly with and removable from the said casing.

7. The subject matter of claim 1, the outer one of the said annular seating means having an annular inwardly tapered peripheral portion and being slightly rockable to said means providing said fluid sealing relation to facilitate assembly of said closure member with the casing.

References Cited in the file of this patent
UNITED STATES PATENTS

| | | |
|---|---|---|
| 2,201,895 | Glen | May 21, 1940 |
| 3,037,738 | Jackson | June 5, 1962 |